Jan. 15, 1963  A. G. DE CLAIRE, JR., ETAL  3,073,166
RATIO COMPUTING DEVICE
Filed March 30, 1959  2 Sheets-Sheet 1
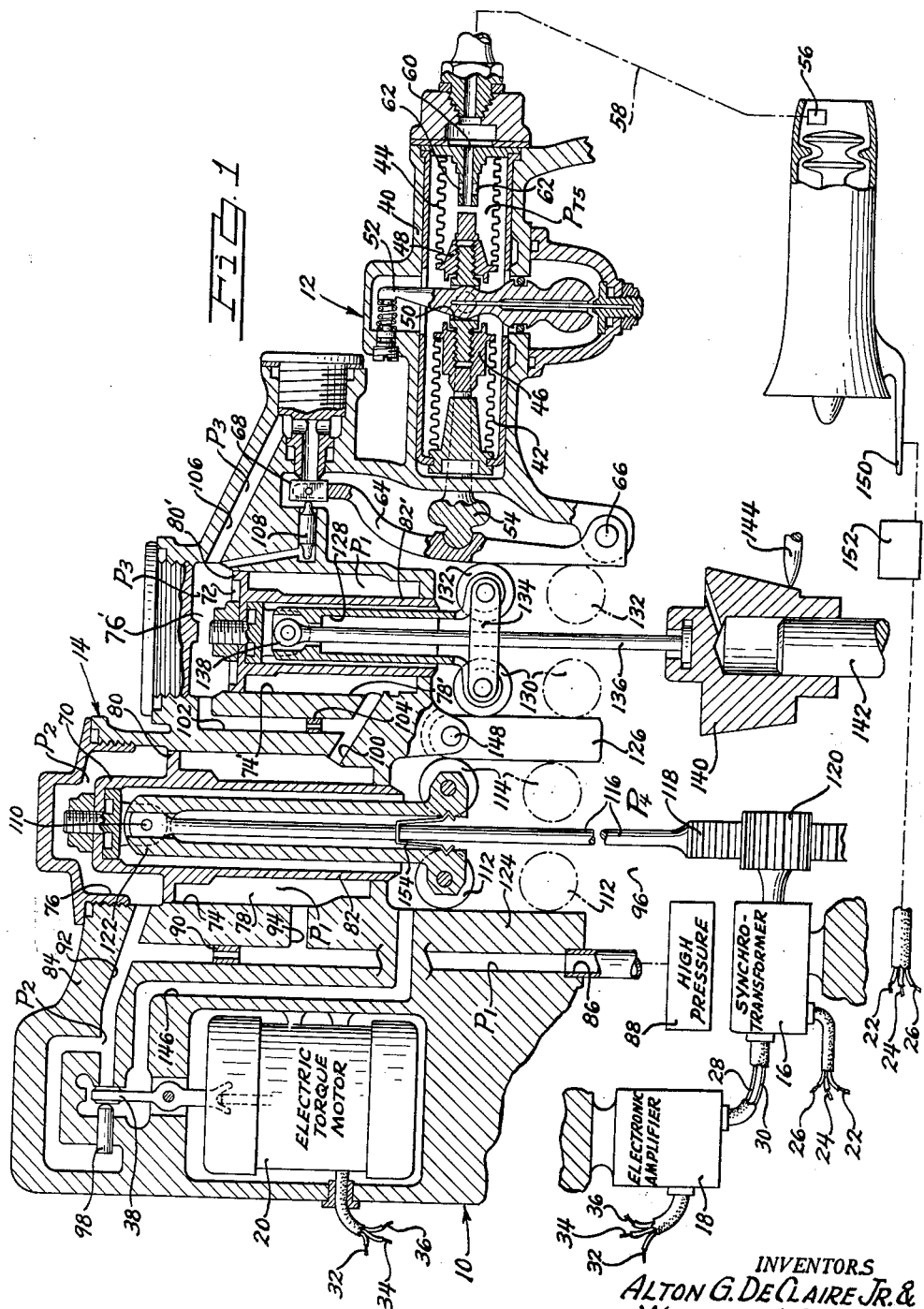
INVENTORS
ALTON G. DE CLAIRE JR. &
BY WARREN H. COWLES
Walter Patonoka, Sr.
ATTORNEY

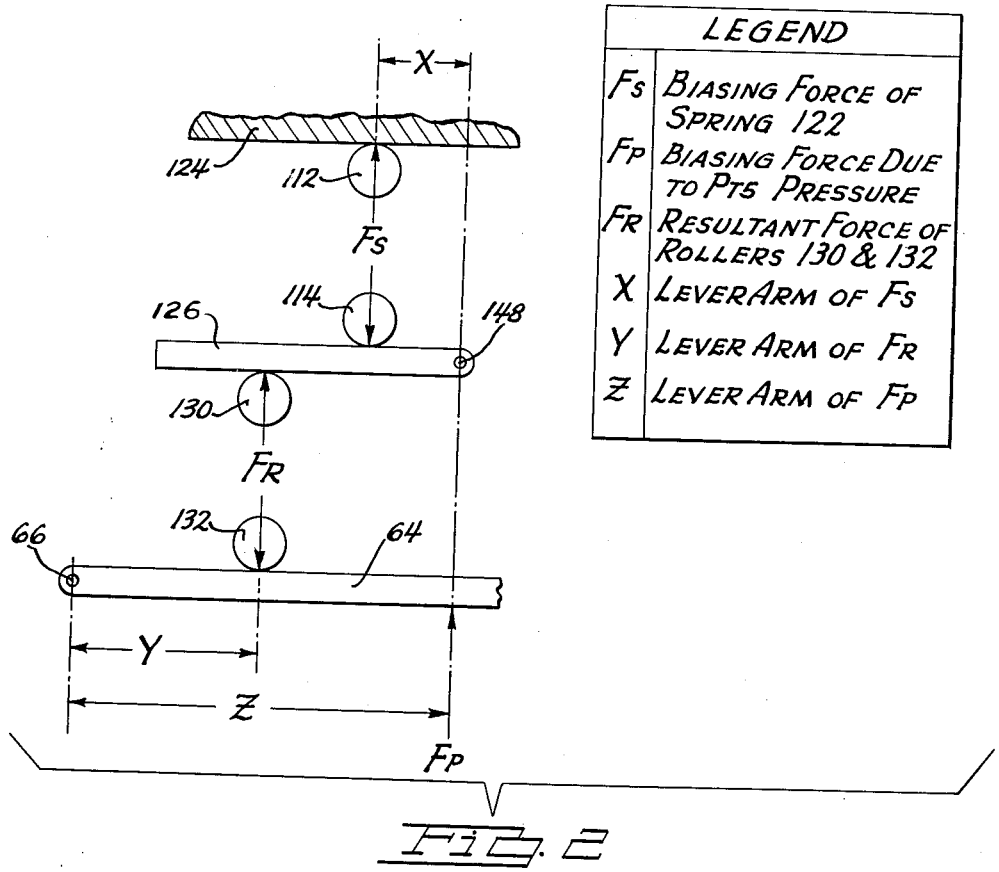

United States Patent Office 3,073,166
Patented Jan. 15, 1963

3,073,166
RATIO COMPUTING DEVICE
Alton G. De Claire, Jr., Harper Woods, and Warren H. Cowles, Detroit, Mich., assignors to Holley Carburetor Company, Van Dyke, Mich., a corporation of Michigan
Filed Mar. 30, 1959, Ser. No. 803,033
5 Claims. (Cl. 73—419)

This invention relates generally to force balance systems, and more specifically to those force balance systems required to have an output equal to the ratio of two or more variable input signals.

In many instances, especially in aircraft applications, signals are generated in terms of hydraulic, pneumatic, mechanical, and electrical forces, either singularly or collectively. A difficulty arises in cases where some controlled mechanical output must be created in response to two or more input signals which are dissimilar in their physical qualities. That is, one of these input signals may be in terms of electrical forces while another signal may be in terms of pneumatic forces.

Accordingly, an object of this invention generally is to provide means for creating an output movement which is a function of two or more input signals, and more specifically, to provide means for creating an output movement which is a function of two or more input signals deriving their forces through dissimilar media.

Another object of this invention is to provide means for computing the ratio of two variable input signals and creating an output movement which is a function of the computed ratio.

Other objects and advantages will become apparent when reference is made to the following specification and illustrations wherein:

FIGURE 1 is a cross-sectional view of a force-balance system constructed in accordance with this invention.

FIGURE 2 is a schematic representation of the force-balance system employed within the invention.

Referring now in greater detail to the drawings, FIGURE 1 illustrates a system embodying the invention as being comprised of three generally distinct subassemblies, namely, the electrical signal receiving portion 10, the pneumatic pressure signal receiving portion 12, and the computer portion 14.

The electrical signal receiving portion 10 is further comprised of the usual synchro-transformer 16 which receives an impressed voltage from some other remote signal producing member, an electronic amplifier 18 and an electric torque motor 20 which ultimately changes the electrical energy to a hydraulic force. The internal construction and operation of the above electrical devices are well known in the art.

A voltage signal produced by some remote signal producing member is impressed on the input leads 22, 24, and 26 of the synchro-transformer 16 and is then transmitted to the electronic amplifier 18, as by the electrical connections 28 and 30. The voltage is then amplified some sufficient degree and directed to the electronic torque motor 20, as by leads 32, 34, and 36. The electronic torque motor 20, which is of conventional design, then rotates the valve member 38, as for example counter-clockwise, thereby creating a hydraulic force. The operation of the electrical signal receiving portion 10 will be more fully explained subsequently in the discussion.

The pneumatic signal receiving portion 12 is comprised generally of a housing 40 having therein an evacuated bellows 42 and a second penumatic pressure receiving bellows 44. Adapter members 46 and 48 are received by the free ends of bellows 42 and 44, respectively, in a manner so as to provide an opening 50 through which a pivotally mounted lever 52 is received. A yoke-type linkage 54 is connected to the lever 52 so as to be responsive to all movements of the bellows 42 and 44 and the lever 52.

Any desired pneumatic pressure, such as that developed by the turbine discharge pressure illustrated at 56 for example, is directed by any suitable conduitry 58 to the interior of bellows 44, as by conduit 60 and orifices 62. As the pneumatic pressure increases, lever 52 will be rotated counter-clockwise and linkage 54 will be moved to the left, causing lever 64 to rotate counterclockwise about pivot 66. Valve 68, secured to the free end of lever 64, is thereby moved some distance away from its coating seat so as to create a hydraulic pressure, as will be more fully explained subsequently.

The computer portion 14 is comprised generally of two multiple diameter pistons 70 and 72. Piston 70 is received in a cylindrical chamber 74 and, by virtue of its largest diameter 80, divides the cylinder into two variable and distinct chambers 76 and 78. The piston 70 has two different effective diameters 80 and 82 which in turn provide different projected areas exposed to two different pressures. One end of chamber 74 has an opening therein which is adapted to slidably receive the smaller diameter 82 of the piston 70 and allow the piston to respond to variations in pressures which exist in both chambers 76 and 78. The proposed structure employs a hydraulic system in order to provide these different pressures; however, it is conceivable that pressures could also be supplied through a pneumatic system. Piston 72 is basically similar to piston 7, and all like or similar portions thereof are identified with primed numerals.

The housing 84 also provides suitable conduitry for communication of the various hydraulic pressures. Conduit 86 communicates with a source of high pressure indicated generally at 88 and has a restriction 90 therein. Two branch conduits 92 and 94 communicate with conduit 86 on opposite sides of restriction 90 and are also in communication with chambers 76 and 78, respectively. The other end of conduit 92 is in controlled communication with an area of relatively low and stable pressure P4, as the general cavity 96 of the housing 84. The valve 38 controls the communication between conduit 92 and cavity 96 is accordance with the force developed by the electric torque motor 20. A hydraulic balance pin 98 may be provided to offset any transient forces produced by the relatively high pressure in conduit 92.

Communication between chambers 78 and 78' is accomplished by the provision of a conduit 100. A branch conduit at 102 having a restriction 104 therein communicates between chamber 76' and conduit 100. Conduit 106 is in controlled communication with cavity 96 by means of a pivotally supported valve 68. A balancing pin 108 may be provided for the same purpose as pin 98.

A generally U shaped leaf type spring 122 is pivotally supported, as by pin 110, within piston 70 and has rollers 112 and 114 secured to the free ends thereof. A rod member 116, also pivotally supported at one end within piston 70, has a gear rack 118 formed at its other end. The rack is adapted to coact with a gear 120 which determines the position of some of the electrical elements within the synchro-transformer 116. The movement of roller 112 to the left is continually restricted by a positive abutment 124, whereas the movement of roller 114 to the right is resiliently restricted by a pivotally supported rail 126.

Piston 72 has a pivotally supported projection 128 which appears similar to the leaf spring 122. However, the rollers 130 and 132, which are secured to the free end of projection 128, are maintained in a constant relationship to each other by means of a restraining linkage 134 connecting both to each other. As a result of this linkage 134, no spring force influences the relative positions of rollers 130 and 132. A rod 136 pivotally mounted at one end 138 to piston 72 has its other end received by a cam member 140, and it is adapted to move the cam member axially upon shaft 142 in accordance with the position of piston 72. A follower 144 is moved either to the left or right, depending on the movement of cam 140.

General Operation

For purposes of illustration, let it be assumed that the system as disclosed in FIGURE 1 is at equilibrium and that there is some flow past valves 38 and 68. At this time, there will be a certain value for $Pt5$, the turbine discharge pressure, and the impressed voltage on leads 22, 24 and 26. It should be mentioned that the voltage signal may be in terms of plus (+) and minus (−), or it may be in terms of plus (+) or minus (−) alone.

Now let it be further assumed that the voltage signal to the synchro-transformer is increased. After the electronic amplifier 18 raises the signal to a working level, it is fed into the electric torque motor 20 which responds by rotating the valve, say for example, clockwise. As the valve 38 moves closer to its seat, the pressure P2 in conduit 92 and chamber 76 increases, tending to approach the high pressure P1 which exists in conduit 86 and chamber 78. The pressure P1 however, remains relatively constant.

As a result of pressure P2 approaching pressure P1, the piston 70 is moved downwardly since the combined force resulting from P4, applied on its effective diameter 82, and P1, applied on its effective diameter of 80 minus diameter 82, is less than the force of P2 over the entire area of diameter 80.

As piston 70 moves downwardly, the rack 118 is moved correspondingly so as to rotate gear 120. The rotation of gear 120 causes like rotation of some elements within the synchro-transformer; as these elements are rotated, they tend to progressively diminish the magnitude of the signal voltage which is conveyed to the electronic amplifier. The effect of this rotation by rack 118 is to tell the synchro-transformer and torque motor, that in response to the last increase in signal voltage the piston 70 has been moved a sufficient and proper amount.

Additionally, as the piston 70 moves downwardly, the rollers 112 and 114 which are secured to the piston through the leaf spring 122 are also moved downwardly. As the rollers so move, the force of spring 122 which tends to move the rollers away from each other causes the rollers 112 and 114 to bear against the abutment 124 and rail 126, respectively. As a result of the downward movement of these rollers, an increased torque is imposed on rail 126 about its pivot 148, causing a greater force to be transmitted through rollers 130 and 132 and linkage 134. Since the linkage 134 prevents any spring action to take place as between the rollers 130 and 132, the increased force is applied directly to the lever 64.

Assuming now that the pressure $Pt5$ has remained constant, the increased force applied to lever 64 will cause the lever to rotate clockwise about its pivot 66, consequently causing the valve 68 to move closer to its coacting seat. The added restriction to flow past valve 68 causes the pressure P3 in conduit 106 and chamber 76′ to increase to some value tending to approach P1. The resulting action is similar to that described previously in conjunction with piston 70, in that piston 72 is moved downwardly. The movement of piston 72 and rollers 130 and 132 continues until the torque applied to lever 64 is diminished sufficiently to enable the force transmitted by linkage 54, due to $Pt5$, to return and/or stabilize the movement of lever 64 and valve 68 so as to place it in a null position again. Of course, the movement of piston 72 ultimately positions cam 140 and some functional follower 144.

Theoretical Operation

From the previous discussion, it is apparent that the movement of piston 70 is a function of the electrical signal to the synchro-transformer 16. Referring now to FIGURE 2, this movement is represented by "X" designating the distance that the rollers 112 and 114 are away from pivot 148.

Whenever the system is in equilibrium, it is apparent that:

(1) $$Fs(X) = F_r(Z-Y)$$

From an inspection of both FIGURES 1 and 2, however, it is seen that:

(2) $$F_r(Y) = [Pt5(A_B)][Z]$$

where: $A_B$ = effective area of the bellows 44.

Therefore, substituting Equation #2 into Equation #1:

(3) $$Fs(X) = \left[\frac{Pt5(A_B)Z}{Y}\right]\left[Z-Y\right]$$

and cross-multiplying and cross-dividing:

(4) $$Y = \left[\frac{Pt5(A_B)Z}{Fs(X)}\right]\left[Z-Y\right]$$

and expanding:

(5) $$Y = \frac{Pt5(A_B)Z^2}{Fs(X)} - \frac{Pt5(A_B)ZY}{Fs(X)}$$

and transposing and factoring:

(6) $$Y\left[1 + \frac{Pt5(A_B)Z}{Fs(X)}\right] = \frac{Pt5(A_B)Z^2}{Fs(X)}$$

As previously stated, X is some function of the electrical signal, which in turn may be some function of an operating parameter such as the ambient pressure, $P_a$, which is sensed by pressure probe 150. The pressure probe may operate in conjunction with some converting device 152 which is capable of converting a pressure sense into electrical signals for purposes of transmission to the leads 22, 24, and 26 of the synchro-transformer 16.

In view of this, it can be seen then that:

(7) $$X = K_1(P_A)$$

where $K_1$ is some constant of proportionality.

Therefore, dividing both sides of Equation #6 and substituting Equation #7 therein, (8) $$Y = \frac{\frac{Pt5(A_B)Z^2}{FsK_1(P_A)}}{1 + \frac{Pt5(A_B)Z}{FsK_1(P_A)}}$$

where: $A_B$, Z, $Fs$ and $K_1$ are all constants.

Therefore:

(9) $$K_2 = \frac{(A_B)Z}{FsK_1}$$

Substituting Equation #9 into Equation #8, it can be seen that the movement of the piston 72, or its position at any time is:

(10) $$Y = \frac{\left[\frac{Pt5}{(P_A)}\right]K_2Z}{1 + \frac{Pt5}{(P_A)} \cdot K_2}$$

From the final equation and Equation #9 it can be appreciated that it is most desirable to maintain the force of spring 122 as constant as possible. Realizing that operation of the overall control in which the invention may be embodied may result in temperature variations of the surrounding medium, provision can be made to compensate for any loss in spring force due to changes in spring rate.

This temperature compensation can be accomplished by the use of a temperature responsive bimetallic spring 154 secured to the leaf spring 122. By this arrangement, the spring force that is lost in spring 122 by the change in spring rate can be thermostatically compensated by the bimetal 154.

Although but one embodiment of the invention has been disclosed and described, it is apparent that other modifications are possible within the scope of the appended claims.

What we claim as our invention is:

1. A device for computing the ratio of two variable input signals and creating an output movement which is a function of the computed ratio, comprising a housing, a first input signal sensing means, a first pressure responsive means influenced by a first and second distinct fluid pressure, a first pivotally supported moment arm, means connected to said first pressure responsive means for resiliently creating and sequentially applying a reference force at various points along said first moment arm, motor means connected to said first input signal sensing means, first valve means connected to said motor means for varying the magnitudes of said first and second distinct fluid pressures, means connecting said first pressure responsive means with said first input signal sensing means for modifying the effect of said first input signal in accordance with the movement of said first pressure responsive means, a second input signal sensing means, a second pressure responsive means influenced by a third and fourth distinct fluid pressure, a source of high pressure fluid for creating said first, second, third and fourth distinct fluid pressures, a rigid force transmitting member connected to said second pressure responsive means and in continuous contact with said first pivotally supported moment arm, an output member secured to said second pressure responsive means producing a movement on some functional follower corresponding to said computed ratio, valve means for varying the magnitudes of said third and fourth distinct fluid pressures, and a second pivotally supported moment arm secured to said valve means and constantly urged in opposing directions by said second input signal sensing means and said force transmitting member.

2. A device for computing the ratio of two variable input signals and creating an output movement which is a function of the computed ratio, comprising a housing, a first input signal sensing means, a first multi-diameter piston means influenced by a first and second distinct fluid pressure, a first pivotally supported moment arm, means connected to said first pressure responsive means for resiliently creating and sequentially applying a reference force of constant magnitude at various points along said moment arm, motor means connected to said first input signal sensing means, hydraulically balanced first valve means connected to said motor means for varying the magnitudes of said first and second distinct fluid pressures, means connecting said first multi-diameter piston means with said first input signal sensing means and for varying the effective magnitude of said first input signal in accordance with the movement of said first multi-diameter piston means, a second input signal sensing means, a second multi-diameter piston means influenced by a third and fourth distinct fluid pressure, a source of high pressure fluid for creating said first, second, third and fourth distinct fluid pressures, a rigid force transmitting member connected to said second multi-diameter piston means and in continuous contact with said first pivotally supported moment arm, an output member secured to said second multi-diameter piston means producing a movement on some functional follower corresponding to said computed ratio, valve means for varying the magnitudes of said third and fourth distinct fluid pressures, and a second pivotally supported moment arm secured to said valve means and constantly urged in opposing directions by said second input signal sensing means and said force transmitting member.

3. A device for computing the ratio of two variable input signals and creating an output movement which is a function of the computed ratio, comprising a housing, a first input signal sensing means, a first pressure responsive means influenced by a first and second distinct fluid pressure, a first pivotally supported moment arm, means connected to said first pressure responsive means for resiliently creating and sequentially applying a reference force at various points along said first moment arm, motor means connected to said first input signal sensing means for varying the magnitudes of said first and second distinct fluid pressures, means connecting said first pressure responsive means with said first input signal sensing means for varying the effective magnitude of said first input signal in accordance with the movement of said first pressure responsive means, a second input signal sensing means, a second pressure responsive means influenced by a third and fourth distinct fluid pressure, a source of high pressure fluid for creating said first, second, third and fourth distinct fluid pressures, a force transmitting member connected to said second pressure responsive means and in continuous contact with said first pivotally supported moment arm, an output member secured to said second pressure responsive means producing a movement on some functional follower corresponding to said computed ratio, valve means for varying the magnitudes of said third and fourth distinct fluid pressures, and a second pivotally supported moment arm secured to said valve means and constantly urged in opposing directions by said second input signal sensing means and said force transmitting member.

4. A device for computing the ratio of two variable input signals, comprising a housing, first and second multi-diameter pressure responsive pistons slideably received within said housing, said first and second pistons being responsive to at least two distinct fluid pressures, a source of high pressure fluid for creating at least one of said two distinct fluid pressures, means for producing an electrical signal, a synchro-transformer for receiving said electrical signal, an electronic amplifier connected to said synchro-transformer for increasing the magnitude of said signal received by said synchro-transformer, an electric torque motor connected to said amplifier for creating a torque proportional to said amplified electrical signal, a first servo valve for varying the magnitudes of said distinct fluid pressures, means connecting said servo valve with said torque motor for positioning said first servo valve in accordance with the torque developed by said torque motor, resilient means pivotally secured to said first piston and moved in response to variations in magnitude of said fluid pressure, rollers secured to said resilient means and urged outwardly away from each other, a rigid restraining member positively limiting the outward movement of one of said rollers, a pivotally-mounted first moment arm yieldingly limiting the outward movement of the other of said rollers, means for producing a fluid pressure signal, bellows for sensing said fluid pressure signal and creating a corresponding fluid pressure signal input force, a pivotally mounted second moment arm, a second servo valve connected to said second moment arm for varying the magnitude of the various pressures influencing said second multi-diameter piston, means for applying said pressure signal input force to said second moment arm at a fixed distance from the pivotal mounting thereof, and a force transmitting member pivotally secured to said second multi-diameter piston, said force transmitting member being in continual contact with said first and second moment arms in a manner so as to apply the moment forces of said first moment arm to said second moment arm and vice versa.

5. A device for computing the ratio of two variable input signals and creating an output movement which is a function of the computed ratio, comprising a housing, a first input signal sensing means, first and second pressure responsive means, conduit means communicating with a source of fluid pressure for directing an actuating fluid from a high pressure source to said first and second pressure responsive means, a first pivotally supported moment arm, means connected to said first pressure responsive means for creating and applying a reference force at various points along said first moment arm, motor means connected to said first input signal sensing means, first valve means operatively connected to said motor means for varying the magnitude of the pressure of said actuating fluid communicated to said first pressure responsive means, means connecting said first pressure responsive means with said first input signal sensing means for modifying the effect of said first input signal in accordance with the movement of said first pressure responsive means, a second input signal sensing means, a force transmitting member connected to said second pressure responsive means and in continuous contact with said first moment arm, an output member secured to said second pressure responsive means producing a movement on some functional follower corresponding to said computed ratio, second valve means for varying the magnitude of the pressure of said actuating fluid communicated to said second pressure responsive means, and a second moment arm operatively connected to said second valve means and constantly urged in opposing directions by said second input signal sensing means and said force transmitting member.

References Cited in the file of this patent

UNITED STATES PATENTS

| | | |
|---|---|---|
| 2,652,813 | Reuter et al. | Sept. 22, 1953 |
| 2,910,870 | Schaeffer | Nov. 3, 1959 |
| 2,970,476 | Cary | Feb. 7, 1961 |

FOREIGN PATENTS

| | | |
|---|---|---|
| 552,962 | Italy | Dec. 13, 1956 |